Patented Jan. 30, 1934

1,944,887

UNITED STATES PATENT OFFICE 1,944,887

ESTERS AND METHOD OF PREPARING SAME

George De Witt Graves, Wilmington, Del., assignor to E. I. du Pont de Nemours & Company, Wilmington, Del., a corporation of Delaware No Drawing. Application July 3, 1931
Serial No. 548,715

8 Claims. (Cl. 260—106)

This invention relates to the preparation of esters and it embraces both novel esters and their method of preparation.

An object of the invention relates to the production of novel chemical compounds comprising the esters of monobasic saturated fatty acids containing from six to thirteen carbon atoms with aliphatic monohydric alcohols containing from twelve to eighteen carbon atoms.

The esters comprising the subject matter of this invention conform to the formula: R-COO-R' in which R is a saturated aliphatic radical containing from five to twelve carbon atoms, and R' is an aliphatic radical containing from twelve to eighteen carbon atoms.

The monobasic saturated acids the acyl radicals of which are contained in the novel ester molecular structure are listed as follows:

Group A

| | |
|---|---|
| Caproic acid | $C_5H_{11}COOH$ |
| Oenanthylic acid | $C_6H_{13}COOH$ |
| Caprylic acid | $C_7H_{15}COOH$ |
| Pelargonic acid | $C_8H_{17}COOH$ |
| Capric acid | $C_9H_{19}COOH$ |
| Undecyclic acid | $C_{10}H_{21}COOH$ |
| Lauric acid | $C_{11}H_{23}COOH$ |
| Tridecylic acid | $C_{12}H_{25}COOH$ |

Saturated aliphatic monohydric alcohols the alkyl radicals of which may be contained in the novel ester molecular structure are as follows:

Group B

| | |
|---|---|
| Lauryl alcohol | $C_{12}H_{25}OH$ |
| Tridecyl alcohol | $C_{13}H_{27}OH$ |
| Myristyl alcohol | $C_{14}H_{29}OH$ |
| Pentadecyl alcohol | $C_{15}H_{31}OH$ |
| Cetyl alcohol | $C_{16}H_{33}OH$ |
| Heptadecyl alcohol | $C_{17}H_{35}OH$ |
| Stearyl alcohol | $C_{18}H_{37}OH$ |

Unsaturated aliphatic monohydric alcohols the hydrocarbon radicals of which may be contained in the novel ester molecular structure are listed as follows:

Group C

Dodecylenyl alcohol $CH_2=CH(CH_2)_9CH_2OH$
Isododecylenyl alcohol
$\qquad CH_3CH=CH(CH_2)_8CH_2OH$
Tridecylenyl alcohol $CH_2=CH(CH_2)_{10}CH_2OH$
Isotridecylenyl alcohol
$\qquad CH_3CH=CH(CH_2)_9CH_2OH$
Pentadecylenyl alcohol
$\qquad CH_2=CH(CH_2)_{12}CH_2OH$
Isopentadecylenyl alcohol
$\qquad CH_3-CH=CH(CH_2)_{11}CH_2OH$
Isohydroeleostearyl alcohol (containing two double bonds) $C_{18}H_{33}OH$
Stearolyl alcohol (containing one triple bond)
$\qquad C_{18}H_{33}OH$
Oleyl alcohol $C_{18}H_{35}OH$
Elaidyl alcohol (the geometrical isomer of oleyl containing one double bond) $C_{18}H_{35}OH$ The generic group containing this latter list of alcohols is intended to include all unsaturated aliphatic monohydric alcohols having from twelve to eighteen carbon atoms and containing one or more unsaturated bonds, whether double or triple, in the hydrocarbon residue.

The following examples illustrate the formation of typical members of the series of new esters:

EXAMPLE 1

Lauryl caproate

A mixture of 23 grams of caproic acid and 39 grams of 96% lauryl alcohol was refluxed for 5 hours at about 200-225° C. in a flask fitted with a steam heated reflux condenser. It was then vacuum distilled. The lauryl caproate fraction amounted to 50 grams and boiled at 28 mm. pressure from 205-210° C. It was a colorless, odorless liquid having an acid number of 0.4 and a saponification number of 183, compared to a calculated value of 197.

EXAMPLE 2

Lauryl laurate

A mixture of 40 grams of lauric acid and 40 grams of 96% lauryl alcohol was heated overnight at 130° C. The product melted at 21° C., had an acid number of 25 and a saponification number of 164.6, compared to a calculated value of 152. It was a light yellow solid.

EXAMPLE 3

Stearyl laurate

A mixture of 29 grams of 95% stearyl alcohol and 20 grams of lauric acid was heated for 5 hours at temperature of 215-230° C. with a slow current of carbon dioxide passing through the liquid. The product was a brown oil which solidified at 37° C. Its acid number was 6.9 and its saponification number was 117, compared to a calculated value of 124.

Example 4

Oleyl-stearyl laurate 2.9 grams of an oleyl-stearyl alcohol mixture (50% by weight of oleyl alcohol and 50 parts by weight of stearyl alcohol) plus 2 g. of lauric acid were heated for 5 hours at 200–250° with a stream of inert gas blowing thru the liquid to carry off water. The product was a light brown solid with a saponification number of 116, the calculated saponification number being 122.

Example 5

Oleyl laurate 1.5 g. of oleyl alcohol was heated with 1 g. of lauric acid for 5 hours at 200–250° with a stream of inert gas blowing thru the liquid to carry off water. The product was a light brown solid with a saponification number of approximately 120.

Example 6

Myristyl caproate 21.4 g. of myristyl alcohol plus 12.2 g. of butyl caproate plus 10 drops of sulfuric acid were fractionated taking off 7 g. of butanol at 115–120° C. The residue of myristyl caproate was washed with dilute sodium hydroxide and with water. The oil layer was dried. The brown oil which resulted had a saponification number of 167, the calculated saponification number being 179.5.

Example 7

A mixture of 1114 grams of double distilled coconut oil acids and 1680 grams of a mixture of the alcohols containing even number of carbon atoms from $C_6$ to $C_{18}$ and obtained by the catalytic hydrogenation of coconut oil, were heated for eight hours at 225° C. The apparatus used was a closed kettle fitted with a steam heated reflux condenser which would allow the water to pass off but would return most of the alcohol. The product was a brown, pasty mass having an acid number of 10.4.

The double distilled coconut oil acids contained the even numbered homologs from $C_6$ to $C_{18}$. The mixture of alcohols contained for the most part saturated alcohols, but also contained some oleyl alcohol. The product of the esterification therefore contained all of the esters which would be formed from the acids and alcohols concerned.

The above examples illustrate the general methods applicable to the preparation of the new esters described herein. The novel esters included under the present invention are made by the ordinary methods of esterification, e. g., by heating the acid and alcohol in equimolecular proportions under conditions which will effect the elimination of the water of esterification, as by rapid vaporization. Another method of esterification is exemplified in Example 6 in which ester interchange takes place on heating a long chain alcohol with an ester of a long chain acid and a volatile alcohol, together with an esterification catalyst such as sulfuric acid. In the process of ester interchange the volatile alcohol is distilled off and the residue consists of the ester of the long chain acid with the long chain alcohol. As equivalents for sulfuric acid I may use hydrochloric acid, sodium butylate, etc.

The conditions under which the esters are prepared may be varied considerably, for example, the removal of water of esterification can be carried on at a temperature sufficiently elevated to boil off the water by simple distillation or reflux distillation, or a current of inert gas, such as carbon dioxide, may be passed through the reacting mixture to assist in removing the water from the sphere of reaction, or esterification may be carried out in the presence of a liquid, such as toluene, which will facilitate the removal of the water by forming a binary mixture which distills at a temperature lower than the boiling point of water. Other related expedients may be availed of to increase the efficiency of the esterification reaction.

The novel esters may be prepared by reacting a single acid with a single alcohol. On the other hand a single acid taken from Group A may be reacted with a plurality of alcohols taken from Group B and/or Group C to produce a plurality of esters, or alternatively, a plurality of acids taken from Group A may be reacted with a single alcohol taken from Group B or Group C to yield a plurality of esters. Mixtures of esters may likewise be prepared by reacting a plurality of acids taken from Group A with a plurality of alcohols taken from Group B and/or Group C.

Any of the acids of Group A may be esterified with any of the alcohols of Group B and/or Group C. Thus the acid may contain a greater, a less, or an equal number of carbon atoms with respect to the alcohol. Thus the character of the ester may be controlled by varying the character of the interacting alcohol and/or acid.

Ordinarily the esterification takes place in the absence of catalysts. However, esterification catalysts such as sulfuric acid, chlorsulfonic acid, and benzene sulfonic acids may be added to the reation mixture in small quantities to accelerate the esterification reaction.

Ordinarily in the preparation of the esters, equimolecular quantities of acid and alcohol will be reacted. However, an excess of either acid or alcohol may be used if desired, the excess being removed from the formed ester by any suitable expedient, e. g., distillation.

The novel esters described herein vary from a liquid wax-like to a solid wax-like consistency. They may be used as substitutes for paraffin wax or the various vegetable waxes in polishes, waterproofing compositions, etc. The new synthetic esters show unique advantages, for certain uses over the natural waxes, particularly in view of the ability of choosing both the alcohol and the acid to modify the properties of the ester. The new esters may also be advantageously used in coating compositions, as softeners for pyroxylin, cellulose acetate or resins, and as high boiling solvents.

The above description of the invention and the examples are to be taken as illustrative only and not as limiting the scope of the invention. Any variation therefrom which conforms to the spirit of the invention is intended to be included within the scope of the claims.

I claim:

1. An ester conforming to the following formula: $R\text{-}COO\text{-}R_1$ in which R is a saturated aliphatic radical containing from five to twelve carbon atoms, and $R_1$ is the radical of a primary aliphatic alcohol containing from twelve to eighteen carbon atoms.

2. An ester conforming to the following formula: $R\text{-}COO\text{-}R_1$ in which R is a saturated aliphatic radical containing from five to twelve carbon atoms, and $R_1$ is the radical of a saturated primary aliphatic alcohol containing from twelve to eighteen carbon atoms.

3. An ester conforming to the following formula: R-COO-R₁ in which R is a saturated aliphatic radical containing from five to twelve carbon atoms, and R₁ is the radical of an unsaturated primary aliphatic alcohol containing from twelve to eighteen carbon atoms.

4. A mixture of esters produced by esterifying a mixture of fatty acids containing at least one saturated fatty acid having from six to thirteen carbon atoms with an aliphatic primary monohydric alcohol containing from twelve to eighteen carbon atoms.

5. A mixture of esters produced by esterifying a mixture of fatty acids containing at least one saturated fatty acid having from six to thirteen carbon atoms with a mixture of alcohols containing at least one aliphatic primary monohydric alcohol containing from twelve to eighteen carbon atoms.

6. A mixture of esters produced by esterifying a saturated fatty acid having from six to thirteen carbon atoms with a mixture of alcohols containing at least one aliphatic primary monohydric alcohol containing from twelve to eighteen carbon atoms.

7. A mixture of esters produced by esterifying a mixture of coconut oil acids with a mixture of aliphatic alcohols produced by the catalytic hydrogenation of coconut oil.

8. The process of forming esters which comprises reacting a monobasic saturated fatty acid containing from six to thirteen carbon atoms with a primary monohydric aliphatic alcohol containing from twelve to eighteen carbon atoms, under esterification conditions.

GEORGE DE WITT GRAVES.